March 7, 1939.  S. A. CANARIIS  2,149,725

APPARATUS FOR CONTROLLING THE OPERATION OF CONE VALVES

Filed March 12, 1937  2 Sheets—Sheet 1

INVENTOR
Svend A. Canariis
By Green & McCallister
His Attorneys

March 7, 1939. S. A. CANARIIS 2,149,725
APPARATUS FOR CONTROLLING THE OPERATION OF CONE VALVES
Filed March 12, 1937 2 Sheets-Sheet 2

INVENTOR
Svend A. Canariis
By Green & McCallister
His Attorneys

Patented Mar. 7, 1939

2,149,725

UNITED STATES PATENT OFFICE 2,149,725

APPARATUS FOR CONTROLLING THE OPERATION OF CONE VALVES

Svend A. Canariis, Pittsburgh, Pa.

Application March 12, 1937, Serial No. 130,525

12 Claims. (Cl. 137—139)

This invention relates to clear flow valves, such as the cone valves employed in water systems, and more particularly to a hydraulic system and apparatus for automatically controlling the opening and closing sequences of such valves.

The primary object of this invention is to provide a hydraulically operated system for controlling the operation of cone valves in which the valve is moved through a helical path during the unseating and seating stages of each closing and opening cycle of the valve.

Another object is to provide a control mechanism for a clear flow cone valve which is simple in construction, has few moving parts, and is easily maintained in operating condition.

A further object is to provide a hydraulic system for automatically controlling the operation of a clear flow cone valve in which definite means are provided for seating and unseating the valve and for moving such valve to its open and closed positions.

A still further object is to provide a hydraulic control mechanism for operating a clear flow cone valve in which means are provided for seating the valve at the end of each opening and closing cycle, and which are actuated in response to the movement of the valve to its open and closed positions.

A still further object of this invention is to provide a control mechanism for clear flow cone valves, which is arranged to automatically and positively move the valve through a spiral path as soon as the valve starts to lift from its seat and to reseat the valve by moving it in a spiral path prior to the completion of the opening or closing cycle thereof, whereby a wiping action is secured which eliminates, to a large extent, injury to the cone valve seat.

These and other objects which will hereinafter be made apparent to those skilled in this particular art are accomplished by this invention, one embodiment of which is described in the following specification and illustrated in the accompanying drawings, wherein Figure 1 is a view in longitudinal section of the cone of a clear flow cone valve adapted to be operated in accordance with my invention;

Figure 1:
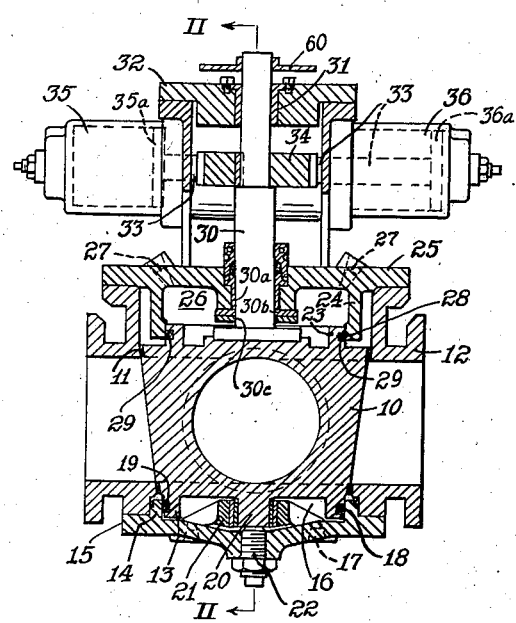

Referring to the drawings in detail, I have illustrated my invention in connection with a tapered plug 10 or cone valve of the construction usually used in water systems, which is adapted to seat, in wedging engagement, against a tapered surface 11 in a valve casing 12 when in its fully closed or open position. In general the valve plug 10 is operated by unseating or lifting the plug at the beginning of the opening cycle from wedging engagement with its seat after which it is turned 90° to its full open position and then again seated. The valve is closed by unseating, and then turning in the reverse direction and then moving it into wedging engagement with its tapered seat. In order that the plug 10 may be hydraulically unseated, the bottom face thereof is provided with a depending annular flange 13 which projects into an annular wall 14 on the bottom head 15 of the valve casing 12, thus forming a piston on the end of the plug which is movable in the space or cylinder 16 between the head 15 and the bottom of the plug and into which hydraulic pressure is introduced through a suitable passageway 17. To maintain a fluid-tight joint between the annular flange 13 and the wall 14 a piston ring 18, formed of micarta or other suitable material, is mounted in a groove 19 formed in the outer surface of the annular flange 13.

The bottom face of the plug 10 is also provided with a downwardly projecting stud 20 which is journaled in a bearing 21 on the inner surface of the head 15 for the purpose of centering the plug 10 in the casing 12, and for holding the valve in proper position during the rotation thereof or turning as it is moved to its open and closed positions. The head 15 has the usual set screw 22 threaded therethrough which abuts against the bottom of the stud 20 and not only permits the valve to be manually raised from its seat but also prevents the valve plug from wedging too tightly thereon.

The upper face of the plug 10 is provided with an annular upstanding flange 23 which projects into an annular wall 24 depending from the top head 25 of the casing 12 and cooperates therewith to provide an upper cylinder 26 between the top of the plug and the head 25 into which hydraulic pressure is adapted to be introduced through the ports 27 to seat or force the plug 10 into wedging engagement with the seat 11.

A micarta ring 28 positioned in groove 29 in the outer surface of the upstanding flange 23 forms a seal which prevents the fluid introduced into the cylinder 26 from escaping between the walls 23—24.

A stem 30 projects upwardly from the plug 10 and is journaled in a bearing 30a in the upper head 25 and the upper end of the shaft is journaled in a bearing 31 in a supporting cross head 32. Annular thrust plates 30b—30c are loosely mounted on the stem 30 and take the thrust between the plug 10 and the upper head 25 when the valve is unseated.

After the plug 10 has been unseated, it is turned from its closed position to its open position, or vice versa, by a rack bar 33 which meshes with a pinion 34 keyed or otherwise secured to the stem 30. The opposite ends of the rack bar 33 are attached to pistons 35a—36a slidable in the opposed cylinders 35—36, and the rack bar is moved in opposite direction to turn the valve plug 10 by delivering hydraulic pressure to one or the other of said cylinders in the manner to be hereafter described.

To control the opening and closing sequences of the valve plug 10, I provide two four-way valves, termed a control valve 37, and a seating and unseating valve 38, which are hydraulically interconnected with each other and are also hydraulically interconnected with the cylinders 16—26, controlling the unseating and seating of the valve 10, and with the cylinders 35—36 controlling the rotating of the cone valve. The four-way valve 37 has a conduit or pipe 40 leading therefrom to a source of hydraulic pressure; a conduit or pipe 41 leading to the operating cylinder 35; a conduit or pipe 42 leading to the operating cylinder 36; and a conduit or pipe 43 leading to drain. The pipe 41 has a branch 44 leading therefrom to the valve 38 which, in turn, has a conduit or pipe 45 connected thereto which leads to the seating cylinder 26 of the cone valve 10, and the pipe 42 has a branch conduit or pipe 46 leading therefrom to the valve 38, which, in turn, has a pipe 47 connected thereto which leads to the unseating cylinder 16 in the lower head 15 of the casing 12.

Commercial one-way check valves, indicated schematically at 48—49—50—51 (Figs. 4-9), are interposed in the conduits 41, 42, 45 and 47, respectively, to control the flow of liquid through the conduits in the direction of the arrows, so that proper timing between the various operations may be obtained. For example, the check valves 48—49 are arranged to check the flow of hydraulic pressure into the cylinders 35—36 but to permit it to be discharged readily therefrom, whereas the check valves 50—51, interposed in the conduits 45—47, permit fluid to flow readily into the cylinders 26, 16 but retard the flow of the motive fluid from those cylinders.

Figure 4:
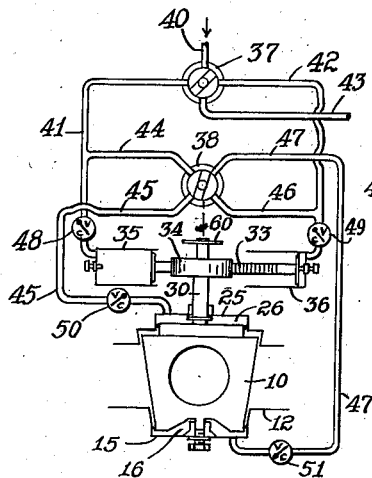
Fig. 4 is a schematic view of my improved control mechanism showing the main valve closed and seated.
Figure 5:
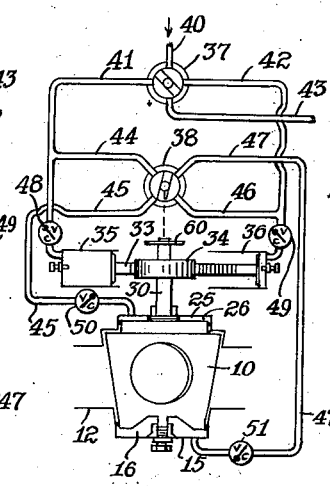
Fig. 5 is a schematic view of the control mechanism showing the position of the valves just after the main cone valve is unseated and has begun to turn in the opening cycle.
Figure 6:
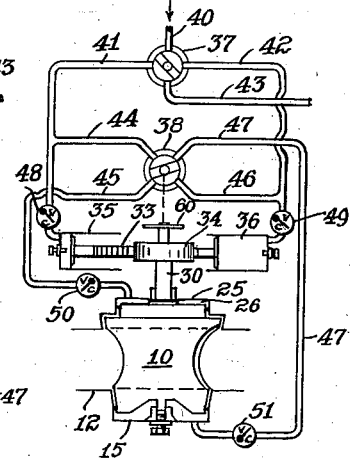
Fig. 6 is a schematic view illustrating the position of the valves of the control mechanism just prior to the completion of the opening cycle of the main valve.

When the cone valve 10 is in its closed position, the valves 37 and 38 are in the positions illustrated in Fig. 4 and in this position hydraulic pressure is being delivered from the pipe 40 through the pipe 41 to the cylinder 35 and through the branch pipe 44, valve 38, line 45 to the seating chamber 26, whereby the plug 10 is held against its seat 11. When it is desired to open the valve 10, the valve 37 is turned 90° (Fig. 5) by any suitable mechanism (none shown) such as a solenoid or any other means adaptable for manual or remote control, and hydraulic pressure is then delivered from the pipe 40 through the valve 37 into the pipe 42 to the cylinder 36 while the cylinder 35 is connected through pipe 41, valve 37 and pipe 43 with the drain. A portion of the fluid in the line 42 flows through the branch 46, valve 38, and into the pipe 47 which delivers it into the cylinder 16. The delivery of hydraulic pressure to the cylinder 16 unseats or lifts the plug 10 from its seat 11, and since fluid pressure is being delivered simultaneously to the cylinder 36, it is apparent that as the plug loosens on its seat it starts to rotate and, consequently, moves through a helical path as it is being unseated and opened, thereby wiping across the valve seat 11.

As the plug 10 approaches its full open position, the valve 38 is operated (Fig. 6) by suitable mechanism hereinafter described which is actuated in response to the turning of the plug 10. When the valve 38 is operated, delivery of hydraulic pressure to the line 47 leading to the cylinder 16 is cut off and the pipe 46 is placed in communication with the line 45 whereby hydraulic pressure is delivered from the line 40 to the cylinder 26 to reseat the valve, and since the valve 38 is operated prior to the completion of the turning movement of the plug 10, it is apparent that the plug moves in a helical path as it is being lowered into contact with the seat 11.

Figure 7:
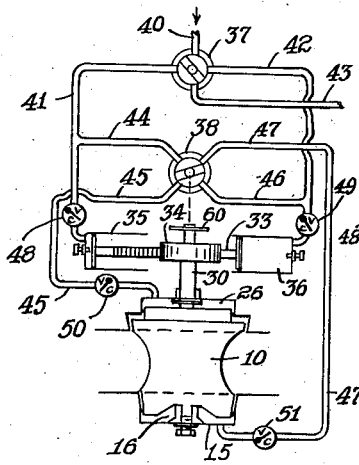
Fig. 7 is a schematic view illustrating the position of the parts at the end of the opening cycle with the main valve fully opened and seated.
Figure 8:
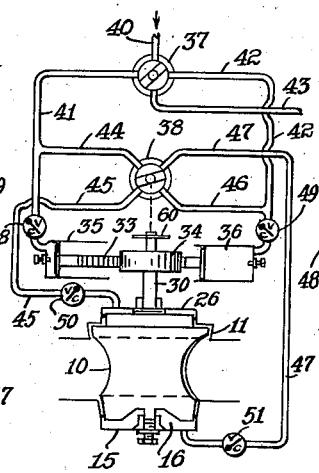
Fig. 8 is a schematic view illustrating the position of the control parts at the beginning of the closing cycle of the valve.
Figure 9:
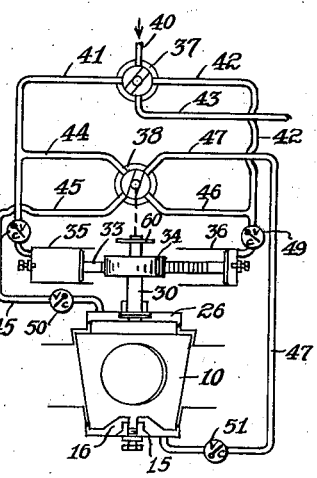
Fig. 9 is a schematic view illustrating the position of the parts of the control mechanism just prior to the completion of the closing cycle of the main valve.

The operation of valve 38 also connects the cylinder 16 through the pipes 47—44—41, valve 37 and pipe 43 with the drain, and the check valve 51 in the pipe line 47 which retards the flow of fluid from the cylinder 16 is so set that a sufficient amount of fluid is retained in the cylinder 16 to prevent the plug 10 from completely seating until after the plug has been turned to its full open position (Fig. 7).

The valves 37 and 38 remain in the position shown in Fig. 7 with hydraulic pressure being delivered to the cylinders 26 and 36 until it is desired to close the plug 10, at which time the valve 37 is again operated and returned to its original position (Fig. 8) connecting the pipe 40 through the pipe 41 with the cylinder 35 and through the branch pipe 44, valve 38, and line 47 with the unseating cylinder 16. At the same time, the cylinders 26 and 36 are connected to the drain pipe 43 through the pipe 45, valve 38, pipes 46, 42 and valve 37. Since the flow of fluid pressure into the cylinder 35 is restricted by the check valve 48 and the flow of water from the cylinder 26 is restricted by the check valve 50, it is apparent that the valve 10 will be slowly raised from its seat and that as soon as it has been released from engagement with the seat 11, the pressure in the cylinder 35 moves the rack bar 33 toward the cylinder 36 and starts the valve plug 10 to rotate toward its closed position.

As the plug 10 approaches its fully closed position (Fig. 9), the valve 38 is again actuated and returned to its original position (Fig. 1), thus connecting the pipe 41 through the conduits 44—45 with the plug seating cylinder 26, and at the same time connecting the unseating cylinder 16 through the pipes 47—46—42 and valve 37 with the drain pipe 43. From this construction it is apparent as the plug approaches its closed position it also is moved in a spiral path toward its seat, and the check valve 51 assures the complete closing of the plug before it is wedged against the seat 11. The closing and seating of the plug 10 completes one cycle of operation.

Figure 3:
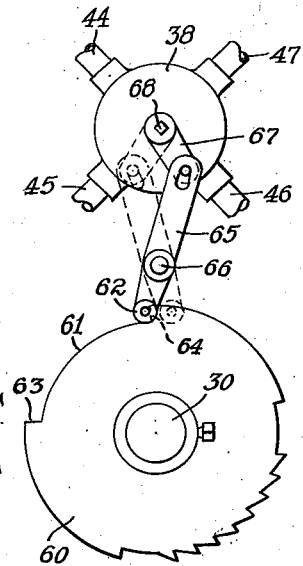
Fig. 3 is an enlarged plan view illustrating the mechanism for operating one of the valves of the control mechanism.
Figure 2:
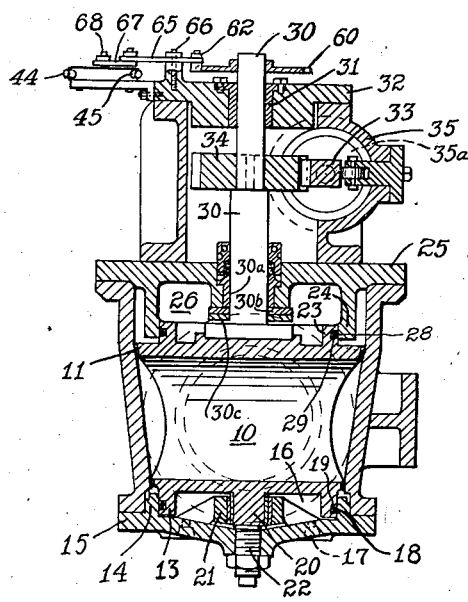
Fig. 2 is a sectional view taken on the line II—II of Fig. 1.
Figure 3A:
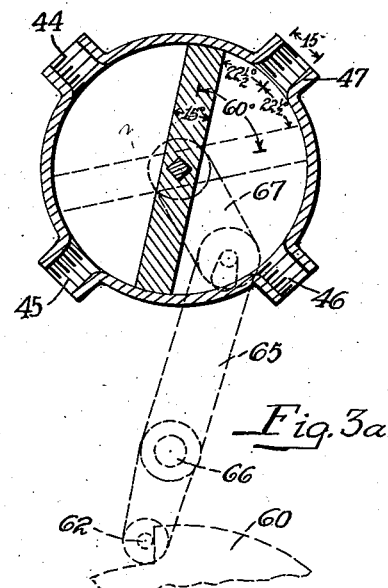
Fig. 3a is an enlarged view of the valve shown in Fig. 3 and having the upper portion thereof removed for convenience of illustration.

The mechanism for operating the valve 38 (Fig. 3) comprises an annular disc 60 secured to the stem 30 of the valve 10 and having a recess 61 in its outer periphery which is somewhat less than 90° in length. A roller 62 of a linkage mechanism is adapted to travel in the recess 61 and to be engaged by the shoulders 63—64 at opposite ends of the recess. The roller 62 is mounted on the end of a lever 65 pivotally mounted on a pin 66 and having its opposite end loosely connected to the outer end of a link 67 which is secured to the stem 68 of the valve 38.

From the foregoing it is apparent that since the recess 61 is less than 90° in length and the plug 10 is turned a full 90° to move it from its closed to open position, and vice versa, the shoulders 63—64 will engage the roller 62 prior to the completion of the turning movement of the plug, and thereby turn the lever 65 from its full line position to its dotted line position and operates the valve 38. Preferably, I make the recess 61 of such length that the shoulders 63—64 engage the roller 62 and actuate the valve 38 after the main plug valve 10 has been moved through approximately 84°.

From the foregoing description of my invention, it is apparent that I have provided a system for operating a clear flow cone valve which is simple in construction, has few moving parts, and which is, consequently, easy to maintain in operation. My hydraulically operated control mechanism is not only automatic but is positive in operation and definitely seats and unseats the valve at the beginning and end of each closing and opening sequence.

Further, with a control system in accordance with my invention, the main cone valve moves in a helical path during both the unseating and seating thereof, and an advantageous wiping action is thereby secured which prevents injury to the valve seat and by forming the piston rings of molded micarta, damage to such rings will be eliminated by the turning movement of the cone. It should also be noted that the cylinders controlling the rotation of the valve plug are never deenergized until the plug is to be turned in the opposite direction but that at the end of each turning movement fluid pressure is still delivered to the cylinder and acts to hold the plug from accidentally being turned in the opposite direction before it is fully seated.

It should be noted that while I have described my invention in connection with a hydraulic system, it may be used in any system for controlling the flow of any fluid under pressure and that the words "hydraulic pressure" as used in this specification are synonymous with "fluid pressure".

While I have described one embodiment of my invention, it is to be understood that various changes may be made therein and that the valves of the control mechanism may be interconnected in various other ways without departing from the spirit of my invention or the scope of the appended claims.

What I claim as new and desire to secure by Letters Patent is:

1. Apparatus of the character described comprising in combination, a clear flow cone valve plug having a piston on each end thereof, cylinders in which said pistons operate, fluid actuated means for rotating said valve plug, a four-way valve hydraulically interconnected with said rotating means, a second four-way valve hydraulically interconnected with said cylinders and with said first mentioned four-way valve, means for operating said first mentioned four-way valve to deliver fluid pressure simultaneously to said cone valve plug rotating means and through said second mentioned four-way valve to one of said cylinders and for connecting the other of said cylinders to drain, and means operated by said cone valve plug on rotation thereof for reversing said second mentioned four-way valve to connect the first energized cylinder to drain and the other cylinder to the source of fluid pressure without disturbing the delivery of fluid pressure to said rotating means.

2. In combination with a cone valve plug having cylinders associated therewith for seating and unseating said valve plug, a hydraulic system for controlling the opening and closing sequences of said cone valve plug comprising a valve separately connected to said seating and unseating cylinders and arranged when in one position to connect the unseating cylinder to a source of pressure and the seating cylinder to drain and when in its other position to connect the seating cylinder to the source of pressure and the unseating cylinder to drain, a fluid pressure motor for rotating said valve plug on the unseating thereof, a valve interconnected with said first mentioned valve and with said motor for controlling the delivery of fluid pressure to opposite sides of said motor and to said seating and unseating valve, and means associated with said cone valve plug for actuating said seating and unseating valve as said plug is rotated.

3. In combination with a cone valve having a seating cylinder and an unseating cylinder associated therewith, a hydraulic system for controlling the opening and closing sequences of said valve comprising a four-way valve having a conduit leading to said seating cylinder and a conduit leading to said unseating cylinder, a fluid pressure motor for rotating said valve, a control valve having a conduit leading to one side of said motor and to one side of said four-way valve and a second conduit leading to the opposite side of said motor and to the opposite side of said four-way valve, and means associated with said cone valve for operating said four-way valve.

4. The combination comprising a cone valve plug having a seat and a seating motor and an unseating motor associated therewith, of means for rotating said valve plug, means for simultaneously energizing said unseating motor and deenergizing said seating motor and for actuating said valve plug rotating means to move said valve plug in a helical path from its seat, and means responsive to the rotation of said valve plug for simultaneously deenergizing said unseating motor and energizing said seating motor while said valve continues its rotation in the same direction to move said valve plug in a helical path toward said seat.

5. Mechanism for operating a cone valve plug having a stem, a fluid actuated seating motor and a fluid actuated unseating motor associated therewith, a fluid actuated motor for rotating said cone valve plug and a source of pressure for actuating said motors, comprising a four-way valve arranged when in one position to connect said unseating motor to exhaust and said seating motor to the source of pressure and when in another position to connect said unseating motor to the source of pressure and said seating motor to exhaust, a valve for controlling the delivery of fluid pressure to said seating and unseating valve and to said rotating motor, and means associated with said stem for operating said seating and unseating four-way valve prior to the completion of the rotative movement of said valve plug.

6. Apparatus for operating a cone valve plug held in seated and unseated positions by fluid pressure applied to said plug comprising fluid actuated means for rotating said valve plug, means for relieving the seating pressure and for delivering an unseating pressure to the valve plug and for energizing said rotating means simultaneously with the unseating of said valve plug to move said valve plug from its seat, and means actuated by said valve plug for relieving the unseating pressure and redelivering seating pressure to said valve plug prior to the completion of the rotation thereof.

7. In combination with a cone valve plug having a seat, of mechanism for controlling the opening and closing sequences of said valve plug, comprising means for seating said valve plug, means for unseating said valve plug, means for rotating said valve plug from one of its positions to the other, means for simultaneously energizing said rotating means and said unseating means and for deenergizing said seating means whereby said valve plug is moved in a helical path away from its seat, and means actuated by said valve plug on the rotation thereof for deenergizing said unseating means and energizing said seating means while maintaining the energization of said rotating means whereby said valve plug is moved in a helical path toward its seat.

8. Apparatus for controlling the opening and closing sequences of a cone valve plug comprising a cone valve plug having a fluid actuated seating motor and fluid actuated unseating motor associated therewith, a shaft on said valve plug, a valve for controlling the delivery of fluid pressure to said motors, said valve being arranged to connect one of said motors to exhaust when the other is connected to the source of fluid pressure, means for delivering fluid pressure through said valve to said unseating motor to unseat said cone valve plug, means for rotating said unseated cone valve plug alternatively in opposite directions, an operating lever for said valve, and means carried by said shaft for actuating said lever to operate said valve and connect said seating motor to the source of fluid pressure and said unseating motor to exhaust as said cone valve plug approaches the end of its travel in either direction.

9. Apparatus for controlling the opening and closing sequences of a cone valve plug comprising a cone valve plug having a fluid actuated seating motor and a fluid actuated unseating motor associated therewith, a shaft on said valve plug, a valve for controlling the delivery of fluid pressure to said motors, said valve being arranged to connect one of said motors to exhaust when the other is connected to the source of fluid pressure, means for delivering fluid pressure through said valve to said unseating motor to unseat said cone valve plug, means for rotating said unseated cone valve plug alternatively in opposite directions, an operating lever for said valve, a linkage mechanism connected to said operating lever, and means carried by said shaft for actuating said linkage mechanism and operating said valve as said cone valve plug approaches the end of its travel in either direction.

10. Apparatus for controlling the opening and closing sequences of a cone valve plug having a stem, a fluid actuated motor for seating said valve plug, a fluid actuated motor for unseating said valve plug, a source of fluid pressure, a valve associated with said motors for controlling the delivery of fluid pressure thereto and adapted to connect one of said motors to exhaust when the other is connected to such source, means for directing fluid pressure from such source through said valve and into said unseating motor to lift said cone valve plug from its seat, means for rotating said unseated cone valve plug alternatively in opposite directions, operating mechanism for said valve, and means carried by said stem for engaging and actuating said valve operating mechanism as said plug approaches the end of its travel in either direction to connect said seating motor to such source of pressure and the unseating motor to exhaust and thereby reseat said cone valve plug.

11. Apparatus for controlling the opening and closing sequences of a cone valve plug having a shaft thereon, a fluid actuated motor for seating said valve plug, a fluid actuated motor for unseating said valve plug, a source of fluid pressure, a valve associated with said motors for controlling the delivery of fluid pressure thereto and adapted to connect one of said motors to exhaust when the other is connected to such source, means for directing fluid pressure from such source through said valve and into said unseating motor to lift said cone valve plug from its seat, means for rotating said unseated cone valve plug alternatively in opposite directions, and means carried by said shaft for effecting the operation of said valve as said plug approaches completion of its rotation in either direction to connect said unseating motor to exhaust and said seating motor to such source of pressure and thereby reseat said cone valve plug.

12. Apparatus for controlling the opening and closing sequences of a cone valve plug having a shaft thereon, a fluid actuated motor for seating said valve plug, a fluid actuated motor for unseating said valve plug, a source of fluid pressure, a valve associated with said motors for controlling the delivery of fluid pressure thereto and adapted to connect one of said motors to exhaust when the other is connected to such source, a control valve interposed between said source of pressure and said first mentioned valve, means for operating said control valve to deliver fluid pressure from said source through said first mentioned valve to said unseating motor to move said cone valve plug from its seat, means for rotating said unseated cone valve plug alternatively in opposite directions, an operating lever for said first mentioned valve, and means mounted on said shaft for actuating said operating lever as said cone valve plug approaches the ends of its rotation in either direction to connect said seating motor to such source of pressure and said unseating motor to exhaust and thereby reseat said valve without further operation of said control valve.

SVEND A. CANARIIS.